US006856843B1

(12) United States Patent
Herman, Jr.

(10) Patent No.: US 6,856,843 B1
(45) Date of Patent: Feb. 15, 2005

(54) METHOD AND APPARATUS FOR DISPLAYING AN IMAGE OF A SHEET MATERIAL AND CUTTING PARTS FROM THE SHEET MATERIAL

(75) Inventor: James S. Herman, Jr., Marblehead, MA (US)

(73) Assignee: Gerber Technology, Inc., Tolland, CT (US)

( * ) Notice: Subject to any disclaimer, the term of this patent is extended or adjusted under 35 U.S.C. 154(b) by 527 days.

(21) Appl. No.: 09/150,277

(22) Filed: Sep. 9, 1998

(51) Int. Cl.[7] .......... G06F 19/00

(52) U.S. Cl. .......... 700/95; 700/134

(58) Field of Search .......... 700/59, 95, 134, 700/135, 171, 143; 382/111; 348/125, 128

(56) References Cited

U.S. PATENT DOCUMENTS

| | | | | | |
|---|---|---|---|---|---|
| 4,393,410 | A | | 7/1983 | Ridge et al. | 358/488 |
| 4,485,409 | A | * | 11/1984 | Schumacher | 358/479 |
| 4,583,181 | A | * | 4/1986 | Gerber et al. | 700/143 |
| 4,725,961 | A | | 2/1988 | Pearl | |
| 4,853,866 | A | | 8/1989 | Andrada Galan et al. | |
| 5,089,971 | A | | 2/1992 | Gerber | |
| 5,172,326 | A | * | 12/1992 | Campbell et al. | 700/134 |
| 5,258,917 | A | * | 11/1993 | Bruder et al. | 700/171 |
| 5,333,111 | A | * | 7/1994 | Chaiken et al. | 700/135 |
| 5,487,011 | A | * | 1/1996 | Chaiken | 700/135 |
| 5,508,936 | A | * | 4/1996 | King et al. | 700/135 |
| 5,748,762 | A | * | 5/1998 | Guez | 382/111 |
| 5,753,931 | A | * | 5/1998 | Borchers et al. | 250/559.22 |
| 5,757,424 | A | * | 5/1998 | Frederick | 348/218.1 |
| 5,757,950 | A | * | 5/1998 | Bruder | 382/111 |
| 5,791,215 | A | * | 8/1998 | Morrison et al. | 83/13 |
| 5,831,857 | A | * | 11/1998 | Clarino et al. | 700/135 |
| 5,838,569 | A | * | 11/1998 | Gane | 700/134 |
| 5,953,232 | A | * | 9/1999 | Blaimschein | 700/171 |
| 5,975,743 | A | * | 11/1999 | Bercaits | 700/134 |
| 6,157,868 | A | * | 12/2000 | Abe | 700/134 |
| 6,173,211 | B1 | * | 1/2001 | Williams et al. | 700/131 |
| 6,177,034 | B1 | * | 1/2001 | Ferrone | 264/40.1 |
| 6,205,370 | B1 | * | 3/2001 | Blaimschein et al. | 700/134 |
| 6,239,807 | B1 | * | 5/2001 | Bossut | 345/582 |
| 6,249,616 | B1 | * | 6/2001 | Hashimoto | 382/284 |
| 6,298,275 | B1 | * | 10/2001 | Herman, Jr. | 700/130 |
| 6,314,334 | B1 | * | 11/2001 | Berlin et al. | 700/134 |

FOREIGN PATENT DOCUMENTS

| | | |
|---|---|---|
| DE | 40 00 066 A1 | 7/1991 |
| DE | 43 31 188 A1 | 3/1994 |
| EP | 0 324 561 A2 A3 | 7/1989 |
| EP | 0 577 842 A1 | 1/1994 |
| EP | 518473 A2 | 9/1998 |
| EP | 950480 A2 | 10/1999 |
| EP | 1 096 777 A1 | 5/2001 |
| EP | 1157793 A1 | 11/2001 |
| JP | 2-203681 | 8/1990 |
| WO | WO 98/34767 A1 | 2/1997 |
| WO | WO 99/39867 | 8/1999 |

* cited by examiner

*Primary Examiner*—Leo Picard
*Assistant Examiner*—Zoila Cabrera
(74) *Attorney, Agent, or Firm*—McCormick, Paulding & Huber LLP

(57) ABSTRACT

A method and apparatus for acquiring image data of a plurality of portions of a sheet material calibrating the acquired image data of each portion to address any pincushioning distortions, aligning the calibrated images to form a composite and displaying the composite image to an operator. The system employs a camera that is translated with a cutting assembly and a program for calibrating acquired image data to provide for tiling of captured images.

21 Claims, 7 Drawing Sheets

METHOD AND APPARATUS FOR DISPLAYING AN IMAGE OF A SHEET MATERIAL AND CUTTING PARTS FROM THE SHEET MATERIAL

FIELD OF THE INVENTION

The present invention relates to cutting a sheet material, and more particularly to a method and apparatus for acquiring independent images of a plurality of sections of the sheet material, calibrating the independent images aligning the calibrated images to form a composite image and displaying a composite representation of the sheet material for user nesting or computer nesting.

BACKGROUND OF THE INVENTION

In the creation of many goods such as shoes, certain car seats and even luggage, hides of various animal are used. Although a majority of the hides are of similar size and shape, the nesting of parts to be cut from the hide requires a knowledge of the particular periphery and flaws in the hide.

Traditionally, a hide is disposed on a support surface and inspected by an operator. The operator identifies the periphery and relevant flaws. The operator then manually places patterns of the parts on the hide and cuts the hide accordingly. However, this method is extremely labor intensive and time consuming. This increases the cost of the resulting goods. In addition, skilled operators must be employed to enhance the number of parts that may be cut from a given hide, as costs are also increased when the hide, is not efficiently employed.

Other material such as high end patterned sheet material that is relatively expensive, and custom made sheet materials are often subject to irregularities that preclude fully automated mass handling and processing.

To assist in the handling and processing of such sheet material, prior systems have employed a camera sufficiently spaced from a support surface to allow a single picture to encompass the entire area of the sheet material. While these systems allow an operator to view the entire sheet material, there is insufficient resolution to allow details to be determined. Alternatively, if high resolution cameras are employed, the cameras are prohibitively expensive.

Therefore, a need exists for a system of acquiring and presenting a display of a sheet material to an operator, wherein the display has sufficient resolution to allow for accurate placement of parts to be cut, as well as identification of flaws. The need further exists for such a system that employs commercially available and economically feasible components, while providing a higher resolution than previously available with comparable components.

SUMMARY OF THE INVENTION

The present invention provides for the display of a sheet material, wherein the display is constructed from a plurality of independent calibrated images, each image being of a different portion of the sheet material.

Generally, the present invention includes acquiring image data representing a plurality of different portions of the sheet material and forming calibrated image data by calibrating the acquired image data to correct for image distortions such as pincushioning, perspective distortions and rotation. The system then employs the calibrated image data to form a composite representation of the plurality of portions and displays the composite representation to an operator.

In one embodiment, an image capture device acquires a plurality of images of a sheet material, wherein each image corresponds to a particular portion of the sheet material at a recorded location. Each acquired image is then calibrated to address distortions, such as pincushioning. The calibrated images are then aligned by a program based upon the recorded locations to form a composite image that accurately represents the actual sheet material. The composite image is displayed to an operator. The operator is able to recall part patterns from a database and locate the part patterns on the displayed composite image. The operator can thereby readily try a multitude of part locations on the sheet material (hide) without requiring physical manipulation of actual size templates.

In a further aspect of the invention, a computer algorithm or program may be applied to the composite image to automatically locate a periphery of the sheet material, or hide. Once the periphery of the sheet material is identified by the computer, a nesting program may be applied to maximize utilization of the sheet material.

DETAILED DESCRIPTION OF THE PREFERRED EMBODIMENTS

Figure 1:
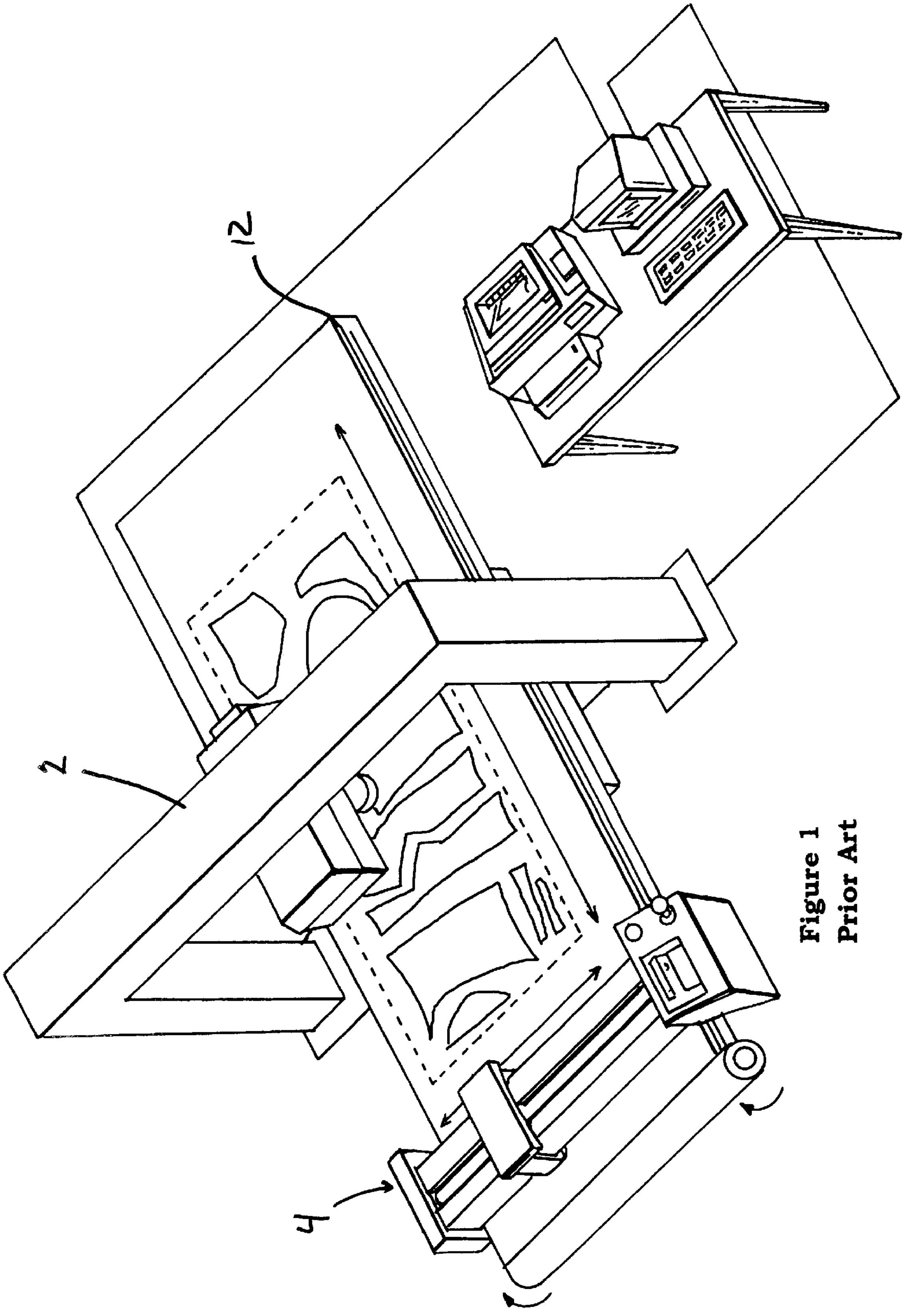
Figure 1 Prior Art
FIG. 1 is a perspective view of a prior system.

As shown in FIG. 1, a prior cutting system employs an overhead imaging stand 2 and a cutting assembly gantry 4. The prior imaging system captures images of a sheet material, as the sheet material passes under the overhead stand.

Figure 2:
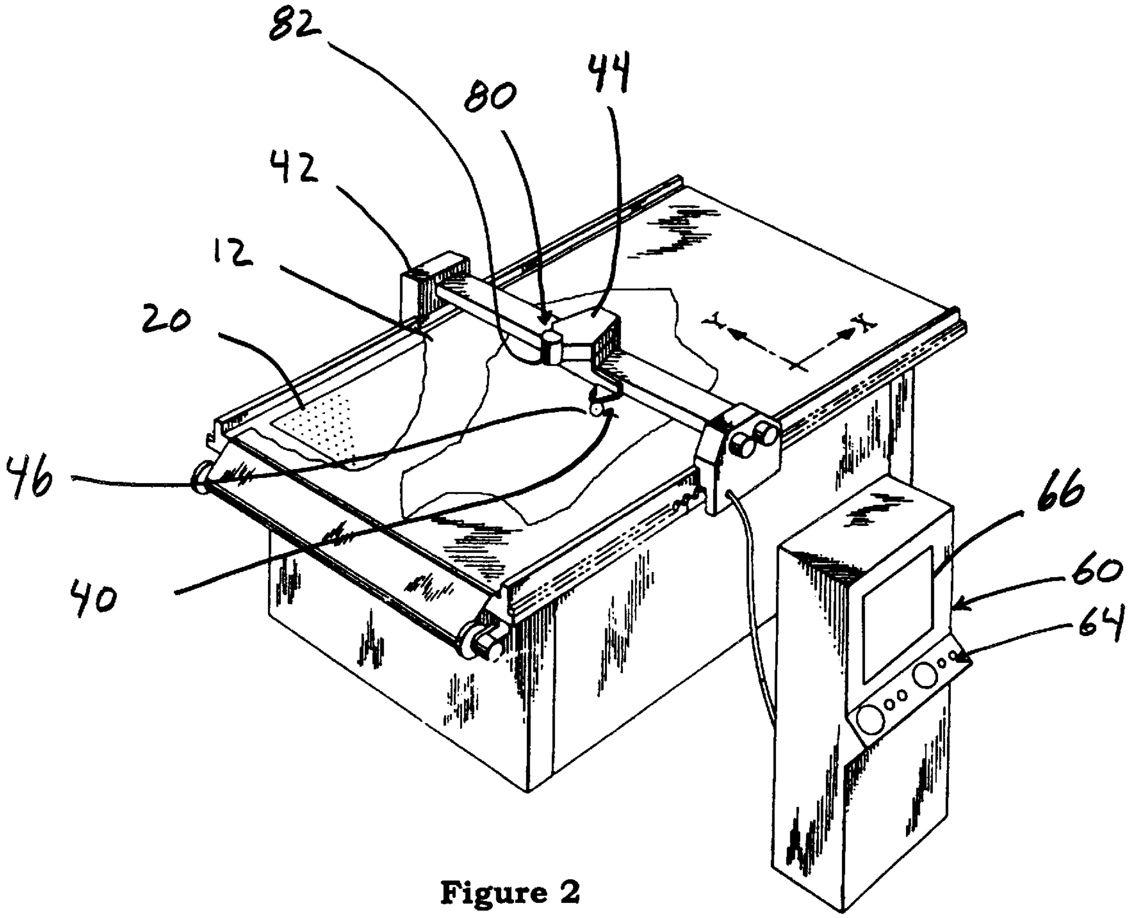
FIG. 2 is a perspective view of a cutting system employing the present invention.

Referring to FIG. 2, the present system includes a support surface 20, a cutter assembly 40, a controller 60 with associated programs, and an image capture system 80. The system displays a composite image of a sheet material 12 to an operator.

The sheet material 12 may be any of a variety of materials such as hides, screen printed material, relatively high end or expensive fabrics, custom or hand formed materials or any other sheet material.

Support Surface

The support surface 20 is a surface upon which the sheet material 12 is spread. The support surface 20 may be any of a variety of structures without departing from the broader aspects of the invention. The support surface 20 may be in the form of a conveyor or an elongate flat table which preferably provides a multiplicity of workstations, such as a projecting/identifying station, a cutting station and a picking station. The support surface 20 may be sufficiently long to accommodate a number of spread sheets. Alternatively, the support surface 20 can be in the form of a drum or inclined plane.

The specific construction and material of the support surface 20 are at least partially dictated by the type of sheet material 12 to be cut as well as the particular type of cutter assembly 40. The support surface 20 may be any of a variety of materials, such as a vacuum permeable surface that permits vacuum retention of the sheet material on the support surface, as known in the field. For example, the support surface 20 may be a penetrable bed formed by a continuous bristle blocks or mats, or by a contiguous blocks of foam material. If desired, one or more vacuum chambers can be provided beneath the penetrable bed. Air passages extend through the bed so that the lay up can be compressed and firmly held against the support surface during the cutting operation.

As shown in FIG. 2, the system defines a longitudinal direction X of the cutter assembly 40 and the sheet material 12 (extending generally from the lower left to the upper right of FIG. 2) and a shorter, perpendicular direction Y of the cutter assembly and the sheet material (extending generally from the upper left to the lower right of FIG. 2).

Cutter Assembly

The cutter assembly 40 includes a gantry 42 movable relative to the support surface 20 along the length of the support surface in an X direction. The gantry 42 carries a Y-carriage 44 movable perpendicular to the length of the support surface 20. The Y-carriage 44 carries a cutter 46, such as a circular blade, wheel cutter, reciprocating knife, laser or water jet. In a configuration of the cutter assembly 40 having a laser cutter, the laser cutter includes a laser beam generator mounted to the cutter assembly, and a laser cutting head supported by the Y-carriage 44 for movement in a direction parallel to and above the support surface 20. The laser cutting head includes a focusing lens. The laser beam is initially directed from the generator toward the mirror, then reflected by the mirror along a path to be focused by the lens onto the sheet material located on the support surface. By way of example, the laser beam is focused to a 0.002 inch diameter spot on the sheet material. A preferred laser is Coherent General Diamond Series.

Controller

The controller 60 controls the cutter assembly 40 as well as movement of the cutter 46. The controller 60 includes a computer such as an IBM compatible PC that accesses a database of cutting instructions such as a marker, or part peripheries. The controller 60 includes or has access to a memory for restoring the database. The controller 60 includes, or is connected to a storage device for retaining sufficient data to form the marker or the periphery of parts to be cut as well as the programs for nesting and generation of cutting instructions. A marker which includes the cutting instructions is formed and stored in the database. The marker is generated by any of a variety of commercial programs from Gerber, Lectra or Polygon.

Operator input to the controller 60 is accomplished through standard input devices 64 including a keyboard or remote pointing device, such as a mouse/track ball. The remote pointing device may include a plurality of buttons as well as the track ball for moving a pointer or indictor. The controller 60 also includes a motion controller, such as a DMC-600 from Galil for effecting motion of the gantry, Y-carriage and the cutter. Industry available software is employed to effect motion of the cutter along a path in response to cutting instructions stored in the database.

It is understood that those skilled in the art, that the controller 60 may employ software to directly control the gantry 42, the cutter 46, the conveyor (if used), all critical input and output such as an emergency stop and cutter termination and other safety related functions, if present, using an operating system in the controller. Alternatively, a commercially available Computer Numerical Control (CNC) controller may be provided between peripheral devices such as the scanners and digitizers and the work station to directly control the devices. CNC controllers are widely available from many suppliers such as Model 8400 marketed by Alan Bradley (Cleveland, Ohio).

The controller 60 also includes or is operably connected to a nesting program. The nesting program may utilize any of the commercially available platforms.

The controller 60 includes a display 66 for displaying the image on a CRT or LCD, or other display. The display is accessible to the operator and is preferably of sufficient size and resolution to permit utilization of the resolution of the acquired image data.

Database

The database includes the periphery of the parts $P_1$, $P_2$, $P_3$ . . . , as well as notch and drill information. That is, the database includes the marker. Preferred orientation of the cut parts or sequencing instructions may also be included in the database as well as any grade requirements for the sheet material from which the part is to be cut.

The database is generated from a variety of inputs including a digitizer/scanner, operator input, part design parameters and nesting programs. It is understood the database may be a single database or a plurality of limited databases or files. Alternatively, the database may be formed of a number of linked or connected files.

Image Capture System

The image capture system 80 includes a camera 82 and associated hardware and software for processing a captured image.

The camera 82 is connected to the gantry 42 and carriage 44 to be movable with the cutter 46. Specifically, the camera 82 is connected to the Y-carriage 44 and is thus relatively near the support surface 20 and any sheet material 12 disposed on the support surface. The camera 82 may be between from approximately 3 inches to approximately 30 inches from the support surface 20. A preferred distance is approximately 16 inches from the support surface 20. The actual distance between the camera 82 and the support surface 20 is at least partially dictated by the particular construction of the cutter assembly 40 and the associated gantry.

As the camera 82 is located on the cutter assembly gantry 42 and carriage 44, and therefore, closer to the sheet material 20 than prior systems, the camera employs a relatively wide angle lens. The lens is sufficient to capture an area of approximately 15 inches by approximately 12 inches of the sheet material on the support surface spaced approximately 16 inches from the camera.

The camera 82 is a readily available camera having a standard resolution of approximately 768 pixels by 576 pixels. While higher resolution cameras may be employed, the present configuration allows the use of relatively inexpensive cameras to provide a relatively high resolution image to a substantially larger area. A preferred camera 82 is a commercially available Hitachi KP-M1E, or equivalent.

As the lens of the camera 82 is a relatively wide angle lens, the lens produces optical distortions due to the short focal length in relation to the size of the portion imaged. This is not a perspective "distortion" that results when a camera is tilted, but a true optical aberration. Straight lines appear curved towards or away from the extreme corners of the image. Straight lines that pass through the center of the image are unaffected. This is sometimes called "barrel" or "pincushion" distortion. That is, a nonlinear geometrical aberration occurs in which magnification changes with field height (i.e. no distortion at center), defined at maximum field. If imaging a square grid, positive distortion gives a pincushion effect while negative distortion yields a barrel effect. The pincushion distortion is of particular importance in the present invention.

A frame grabber for digitally processing image data is employed in the controller 60. A preferred frame grabber includes the Data Translation 3155, a commercially available board for computers.

In one configuration of the apparatus of the present invention, a lighting system may be employed in conjunction with the camera 82 and software. The lighting system provides either a uniform or known and controllable lighting intensity for illuminating the sheet material and particularly the local portions of the sheet material 12 that are being imaged.

Calibration

The present system includes a calibration for accommodating distortion of the captured images of the portions of the sheet material 12. Specifically, the calibration accommodates at least pincushioning and brightness.

Figure 4:
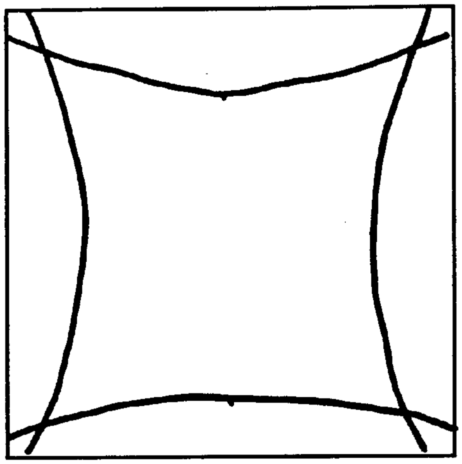
FIG. 4 is a representative captured image showing a pincushioning distortion.
Figure 5:
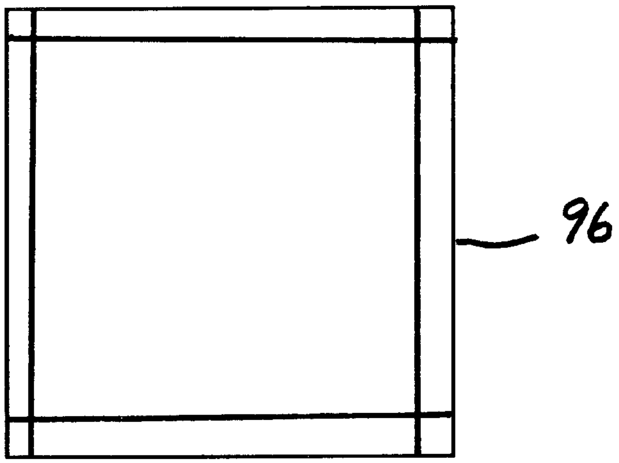
FIG. 5 is a representative captured image after calibration.
Figure 8:
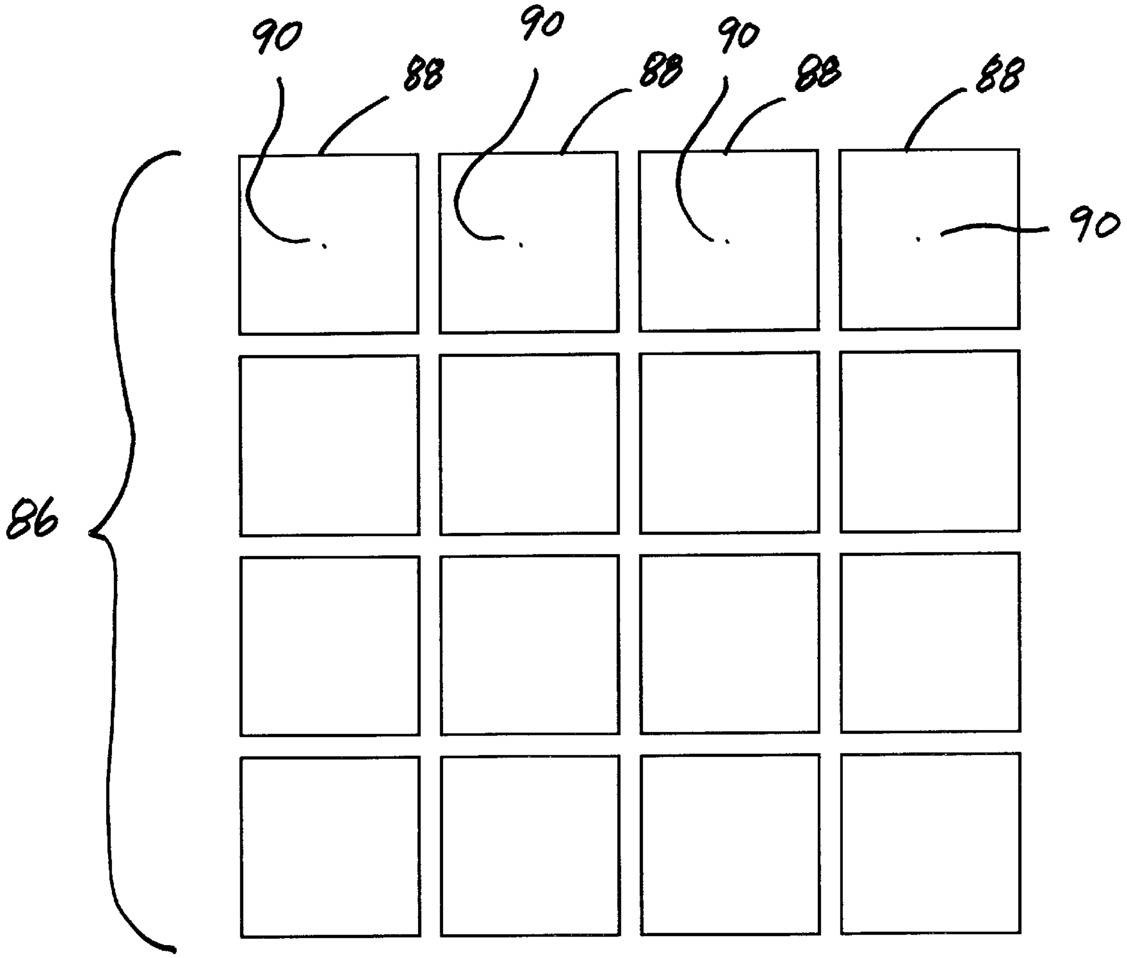
FIG. 8 is a grid for establishing a pincushion distortion calibration for the imaging system.

Referring to FIGS. 4, 5 and 8, to accommodate pincushioning, a grid 86 of known dimensions is located on the support surface 20. The known grid 86 fills a respective portion of the support surface 20 (sheet material) to be imaged. The image capture system 80 then captures the relevant portion of the known grid 86 at a known location or portion of the support surface 20. The calibration program then locates squares 88 and respective centers 90 of the squares. The calibration program then compares the captured image to the known grid 86 for the respective location of the imaged portion and calibrates the captured image to recreate the known grid.

That is, as the image data is captured pincushioning is introduced into the data. The calibration program calibrates the captured image data to correct for the distortions and provide an accurate correspondence between the captured image data and the actual sheet material 12.

In addition, the calibration program may account for brightness of the captured image data. That is, for a given lighting system, it is typical that the light is non uniform across the portion of the sheet material imaged, much less across the entire sheet material to be imaged.

Figure 6:
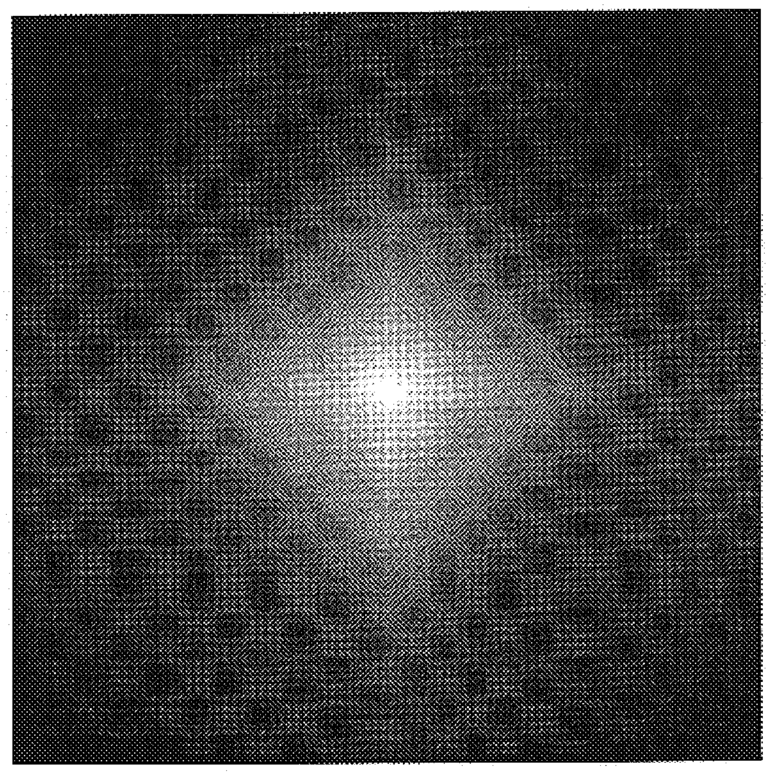
FIG. 6 is a representative captured image showing a brightness variance.
Figure 7:
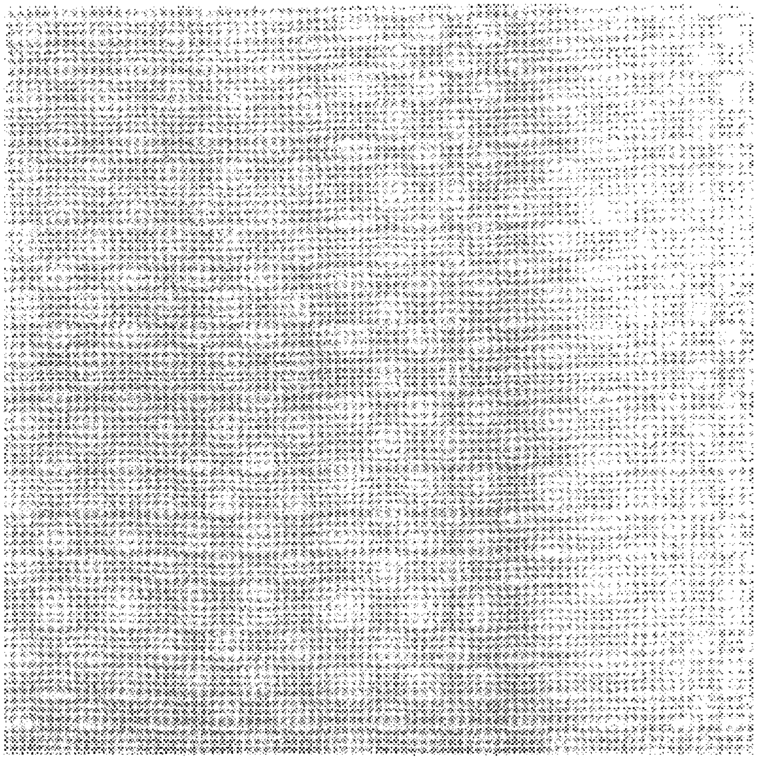
FIG. 7 is a representative captured image after a brightness calibration.

Referring to FIGS. 6 and 7, to provide for the lighting calibration, an image of known intensity FIG. 7 is imaged at a given location on the support surface. The position with respect to the support surface is recorded. The calibration program is then provided to create a uniform lighting intensity at the respective location, or area, of the support surface. Thus, the calibration program learns the relative hot and cold spots throughout the support surface as well as the local portions. Upon image data being captured for a given portion, the calibration program automatically adjusts the captured data to accurately portray the sheet material 12 on the support surface 20.

As the controller 60 then has access to image data of portions of the sheet material 12 and knows the specific location of the image data as well as area of the respective image data, the controller can readily align the calibrated portions to recreate sections or even the entire sheet material as a composite image 92. The composite image 92 is readily shown on the display to the operator.

Operation

In operation, a sheet material 12, such as a hide, is disposed on the support surface.

Figure 3:
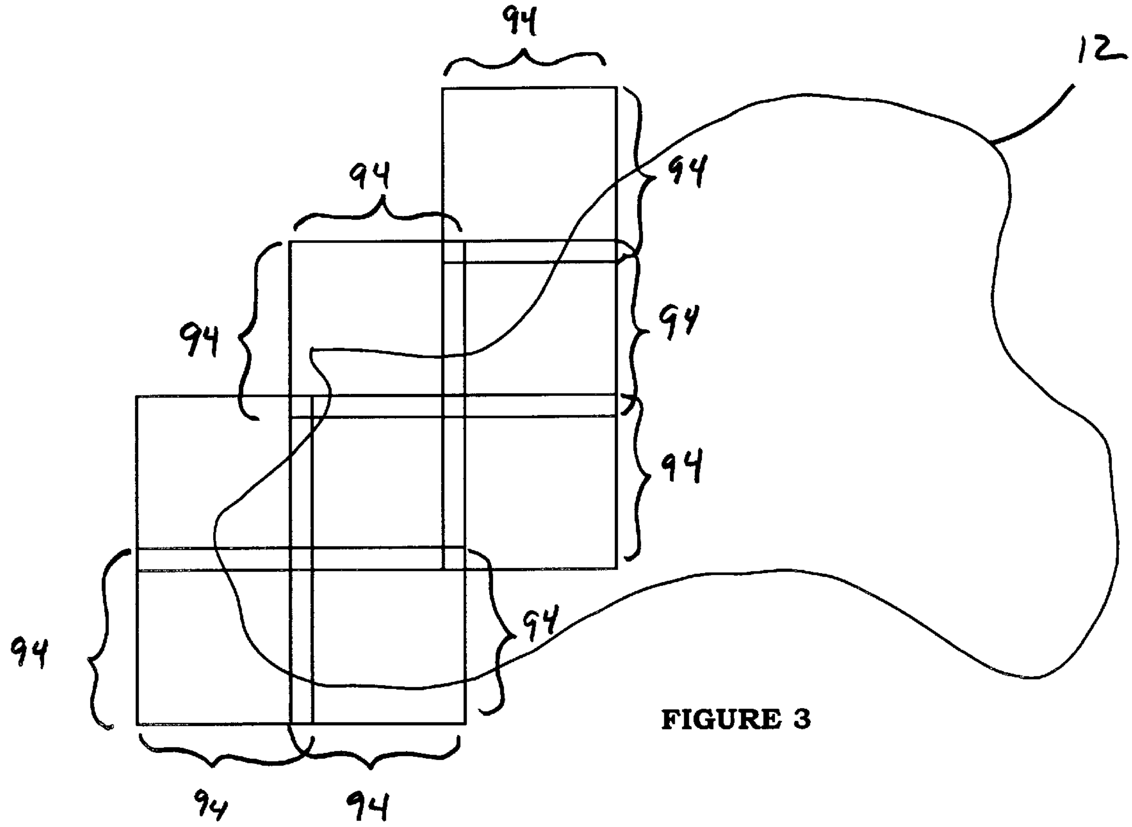
FIG. 3 is a schematic of a plurality of portions that are independently imaged.

The gantry of the cutter assembly 40 that retains the camera 82 is moved with respect to the support surface 20 to locate the camera at a given location. An image of the relevant portion is then acquired by the image capture system 80 and the controller 60. The image data is recorded along with the location of the portion imaged. As the camera 82 images an area that is substantially less than the total area of the hide, a plurality of images must be acquired to capture the entire relevant area of the sheet material 12. That is, as the camera 82 images an area of approximately 15 inches by approximately 12 inches, within a hide area that may span 60 inches by 120, a plurality of portions 94 are imaged as shown in FIG. 3.

The image capture system 80 acquires image data for a sufficient number of portions 94 to encompass the relevant area of the sheet material 12. In a preferred operation, the image capture system 80 acquires a sufficient number of images of portions 94 to encompass the entire sheet material 12. In addition, to ensure that distortions do not result in a failure to acquire sufficient data, the portions 94 of the sheet material 12 are slightly overlapped. The amount of overlap is sufficient to substantially preclude the omission of data intermediate adjacent imaged portions 94.

Figure 9:
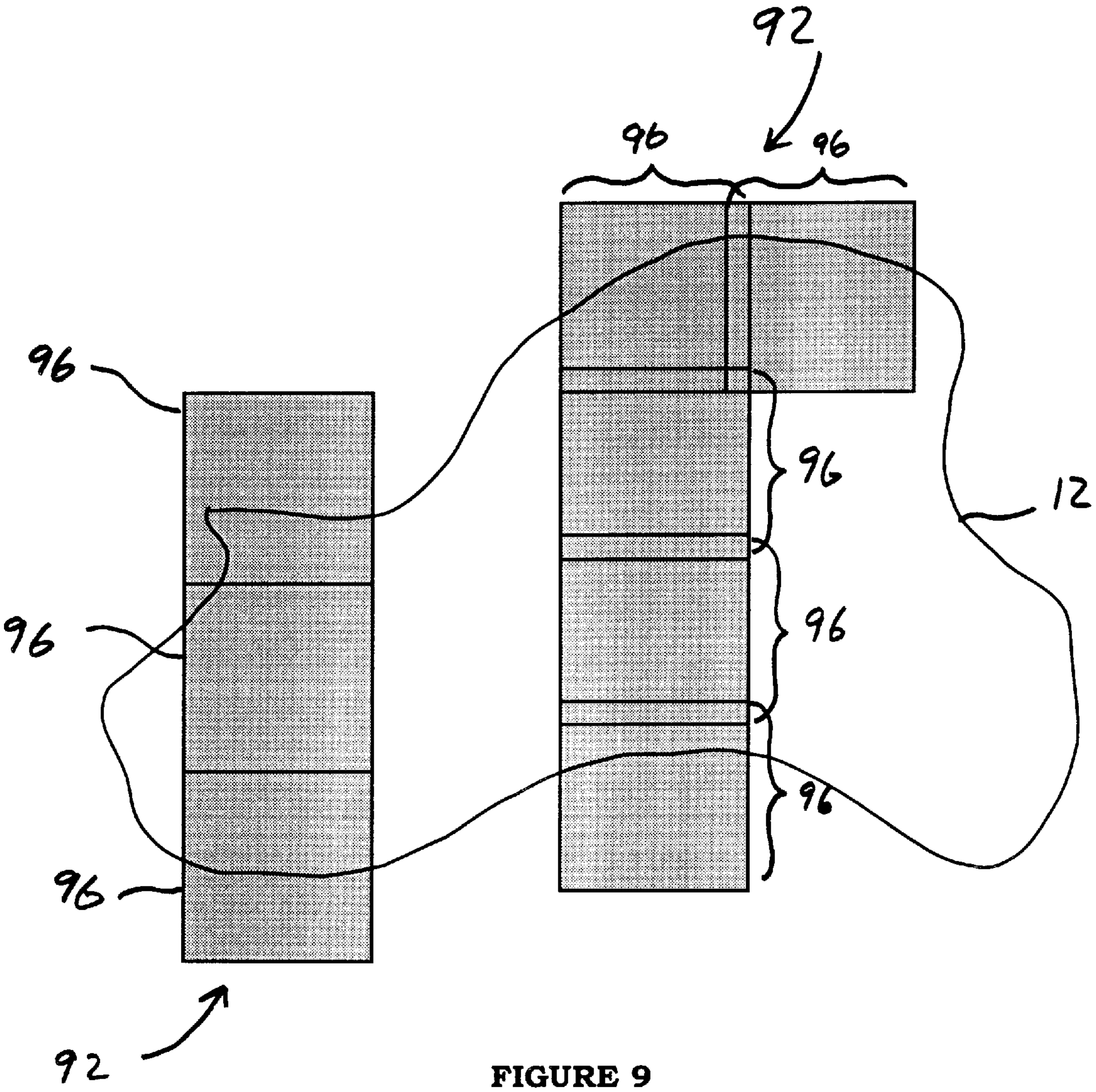
FIG. 9 is a composite representation showing the location of the captured, calibrated images.

The calibration program then calibrates each acquired image to correct for pincushioning and form a tile 96. The tile 96 is a calibrated image of a portion of the sheet material 12. Thus, the periphery of each tile 96 accurately represents the actual corresponding portion of the sheet material 12. As the periphery of each tile 96 is accurate, the program then aligns the respective tiles based upon the recorded location of the camera 82 at the moment of capture and a requirement that a continuous line segment cross adjacent tiles in a continuous manner. Depending upon the program, the tiles 96 may be cropped and aligned to abut adjacent tiles. Alternatively, as shown in the right hand side of FIG. 9, the tiles 96 may be overlapped to a predetermined degree, wherein the image is continues across the overlap. Preferably, as shown in the left hand side of FIG. 9, each tile 96 is exact to a pixel resolution so that upon aligning the tiles, a pixel on the edge of one tile is the next immediate pixel to the edge of an adjacent tile.

The program is thus able to create a composite representation 92 of the entire sheet material 12 from a plurality of tiles 96, wherein each tile is an image of less than the entire area of the sheet material. That is, the present system acquires data representing subsections of the entire relevant area, corrects/calibrates each subsection then aligns the subsections to create a composite image 92 that accurately portrays the particular sheet material 12.

In a further preferred configuration, the calibration program accommodates the variations in lighting intensity and corrects the intensity of each tile. This may be done before or after each tile has been aligned to form the composite image.

The composite image 92 is then displayed to the operator on the display 66. The operator may then selectively recall part patterns from the memory and locate the parts with respect to the composite image on the display 66. Upon obtaining a desired location of the parts with respect to the composite image 92, the controller may give the instruction to cut the sheet material accordingly.

The present system also provides recognition of flaws in the sheet material 12. Once the sheet material 12 is spread on the support surface 20, the operator visually inspects the sheet material and marks the flawed areas on the sheet material. A chalk or other marking device recognizable by the image capture system 80 is used. Thus, upon the respective portions being captured and calibrated tiles 96 formed, the captured image data includes flaw locations and types, if so marked by the operator. The flaw information can then be accommodated upon locating the parts on the display of the composite image 92.

It is further contemplated that a more automated configuration of the system may be provided. Specifically, the controller 60 may be provided with an edge recognition program or software. The edge recognition program operates on the acquired and tiled composite image 92. The controller 60 may thus learn the periphery of the respective sheet material 12. The nesting program may then be employed to locate the necessary parts with respect to the hide and its periphery.

Alternatively, the controller 60 may provide a checking of the operator selected nesting. Further, if flaws are marked prior to acquiring the respective images, the controller 60 may automatically identify the flaws as well as the periphery of the sheet material 12 and automatically nest the parts with respect to a particular sheet material.

As the present system locates at least a portion of the image capture system 80 on the cutter assembly 40, the overhead gantry of prior systems is not required. Thus, the present system requires fewer components. In addition, by calibrating the acquired image data prior to forming the composite image 92, accuracy and speed of the system is increased.

The present system also provides a relatively high resolution image of the sheet material 12, by capturing a plurality of sections, portions, of the sheet material and then creating a composite image. For example, the system may be employed to form a composite image of a sheet material having an area of 10' by 12' or even a web like sheet of 6' by 30' to 40'. The relation of the tiles (image sizes) and, the resolution of the camera is selected to provide the necessary detail, in pixels, of resolution. Thus, the system segments, or breaks the sheet material into a plurality of portions and each portion is captured at the available resolution, calibrated and assembled with respect to adjacent tiles 96 to form the composite image. The composite image 92 thus has significantly higher resolution than previously available with the same camera resolution.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. A method for displaying an image of a sheet material and for cutting parts from the sheet material comprising the steps of:

presenting a sheet material on a support surface;

providing a camera for acquiring a plurality of photographic image data frames, each frame being an image of an areal portion of the sheet material, each frame represented by a plurality of pixels in an X direction and a perpendicular Y direction;

modifying each acquired image data frame to correct distortions of the acquired image of the areal portion;

compiling the image data frames to form a composite photographic image of the areal portions of the sheet material;

displaying the composite image;

locating at least one part with respect to the composite image; and cutting the part from the sheet material.

2. The method of claim 1, further comprising user inspecting the displayed image to identify one of a periphery of the sheet material and a flaw in the sheet material.

3. The method of claim 2, further comprising locating an image of a part with respect to the displayed image by user input.

4. The method of claim 1, further comprising employing an algorithm to automatically identify at least a portion of a periphery of the sheet material.

5. The method of claim 4 wherein the step of locating an image of a part with respect to the displayed image further comprises the steps of:

utilizing an algorithm for nesting a part periphery with respect to the composite image; and cutting the part from the sheet material in accordance with said nesting.

6. The method of claim 1, further comprising calibrating a brightness of the acquired image data.

7. The method of claim 1, further comprising incorporating flaw identification data in the image data.

8. The method of claim 1, further comprising calibrating the acquired image data for at least one of pincushioning, perspective distortion and rotation.

9. A method for displaying an image of a sheet material and for cutting parts from the sheet material comprising the steps of:

presenting a sheet material on a support surface;

providing a camera for acquiring a plurality of photographic image data frames, each frame being an image of an areal portion of the sheet material, each frame represented by a plurality of pixels in an X direction and a perpendicular Y direction;

modifying each acquired image data frame to correct for image distortions of the acquired image of the areal portion;

incorporating flaw identification data in the image data frames;

calibrating a brightness of the acquired image data frames;

compiling the image data frames to form a composite photographic image of the areal portions of the sheet material;

displaying the composite image;

identifying at least a portion of a periphery of the sheet material;

nesting a part periphery with respect to the composite image; and cutting the part from the sheet material in accordance with said nesting.

10. The method of claim 9, further comprising calibrating the acquired image data for at least one of pincushioning, perspective distortion and rotation.

11. The method of claim 9, wherein the step of incorporating flaw identification in the image data, further comprises placing an optically identifiable flaw indicator adjacent a flaw in the sheet material.

12. The method of claim 9, further comprising identifying a flaw in the sheet material using an algorithm.

13. The method of claim 9, further comprising nesting a plurality of parts with respect to the identified portion of the periphery.

14. An apparatus for cutting parts from a sheet material comprising:

a support surface for supporting a sheet material;

a cutting assembly coupled to the support surface for movement with respect to the support surface;

a camera for obtaining photographic image data of a sheet material on the support surface, the camera coupled to the cutting assembly for movement with the cutting assembly, the camera selected to obtain the image data in a plurality of frames, each frame including a plurality of pixels in an X direction and a plurality of pixels in a perpendicular Y direction; and a processor having storage means coupled to the camera and cutting assembly;

means for calibrating said image data frames;

means for combining said calibrated image data frames to obtain a composite photographic image of at least a portion of the sheet material; and a display coupled to the processor for displaying said composite image.

15. The apparatus of claim 14, further comprising means for nesting parts with respect to the calibrated image data.

16. The apparatus of claim 14, wherein the calibration means corrects for one of pincushioning, perspective distortions and rotation.

17. The apparatus of claim 14, wherein the calibration means adjusts a brightness of the captured image data.

18. The apparatus of claim 14, further comprising means for identifying a flaw in the sheet material.

19. The apparatus of claim 14, further comprising a means for identifying at least a portion of the periphery of the sheet material.

20. A method of acquiring image data from a sheet material, comprising:

presenting a sheet material on a support surface;

moving a camera with respect to the support surface to capture a plurality of photographic images of portions of the sheet material, each image including a plurality of pixels in an X direction and a plurality of pixels in a perpendicular Y direction;

modifying each said image to correct distortions therein; and compiling said modified images to form a composite photographic image of a portion of the sheet material.

21. The method of claim 20, further comprising the step of displaying said composite image.

* * * * *